United States Patent
Cross, Jr. et al.

(10) Patent No.: US 7,676,371 B2
(45) Date of Patent: Mar. 9, 2010

(54) ORAL MODIFICATION OF AN ASR LEXICON OF AN ASR ENGINE

(75) Inventors: Charles W. Cross, Jr., Wellington, FL (US); Frank L. Jania, Chapel Hill, NC (US); James R. Lewis, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 936 days.

(21) Appl. No.: 11/423,711

(22) Filed: Jun. 13, 2006

(65) Prior Publication Data

US 2007/0288241 A1 Dec. 13, 2007

(51) Int. Cl.
*G10L 21/00* (2006.01)
*G10L 15/22* (2006.01)
(52) U.S. Cl. .................................. 704/270.1
(58) Field of Classification Search ............... 704/270.1
See application file for complete search history.

(56) References Cited

U.S. PATENT DOCUMENTS

| | | | |
|---|---|---|---|
| 5,577,165 A | 11/1996 | Takebayashi et al. | |
| 5,584,052 A | 12/1996 | Gulau et al. | |
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,513,011 B1 | 1/2003 | Uwakubo | |
| 6,606,599 B2 | 8/2003 | Grant et al. | |
| 6,694,296 B1 * | 2/2004 | Alleva et al. | 704/255 |

(Continued)

FOREIGN PATENT DOCUMENTS

| | | |
|---|---|---|
| CN | 1385783 | 12/2002 |
| CN | 1385783 A | 12/2002 |
| CN | 1564123 A | 1/2005 |
| EP | 0794670 A | 9/1997 |

(Continued)

OTHER PUBLICATIONS

Axelsson, et al.; "XHTML+Voice Profile 1.2" Internet, [Online] Mar. 16, 2004, pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner*—Susan McFadden
(74) *Attorney, Agent, or Firm*—Wolf, Greenfield & Sacks, P.C.

(57) ABSTRACT

Methods, apparatus, and computer program products are described for providing oral modification of an ASR lexicon of an ASR engine that include receiving, in the ASR engine from a user through a multimodal application, speech for recognition, where the ASR engine includes an ASR lexicon of words capable of recognition by the ASR engine, and the ASR lexicon does not contain at least one word of the speech for recognition; indicating by the ASR engine through the multimodal application to the user that the ASR lexicon does not contain the word; receiving by the ASR engine from the user through the multimodal application an oral instruction to add the word to the ASR lexicon, where the oral instruction is accompanied by an oral spelling of the word from the user; and executing the instruction by the ASR engine.

12 Claims, 6 Drawing Sheets

U.S. PATENT DOCUMENTS

| | | | |
|---|---|---|---|
| 6,801,604 B2 * | 10/2004 | Maes et al. | 379/88.17 |
| 6,856,960 B1 | 2/2005 | Dragosh et al. | |
| 6,920,425 B1 | 7/2005 | Will et al. | |
| 6,973,427 B2 * | 12/2005 | Hwang et al. | 704/249 |
| 6,999,930 B1 | 2/2006 | Roberts et al. | |
| 7,035,805 B1 | 4/2006 | Miller | |
| 7,150,399 B2 | 12/2006 | Barrus et al. | |
| 7,171,243 B2 | 1/2007 | Watanabe et al. | |
| 7,188,067 B2 | 3/2007 | Grant et al. | |
| 7,330,890 B1 | 2/2008 | Partovi et al. | |
| 7,376,586 B1 | 5/2008 | Partovi, et al. | |
| 7,379,874 B2 * | 5/2008 | Schmid et al. | 704/270 |
| 7,487,085 B2 | 2/2009 | Cross | |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Sienel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Farrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong | |
| 2004/0260562 A1 | 12/2004 | Kujirai | |
| 2005/0075884 A1 | 4/2005 | Badt | |
| 2005/0091059 A1 | 4/2005 | Lecoeuche | |
| 2005/0131701 A1 | 6/2005 | Cross | |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0265851 A1 | 11/2007 | Cross et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Cross et al. | |
| 2008/0162136 A1 | 7/2008 | Cross et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |

FOREIGN PATENT DOCUMENTS

| | | |
|---|---|---|
| EP | 1450350 | 8/2004 |
| GB | 0507148.5 | 4/2005 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005, pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al., Robust Semantic Confidence Scoring ICSLP 2002: 7$^{th}$ International Conference On Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/919,005, filed Dec. 2005, Eichenberger, et al.

U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.

* cited by examiner

ORAL MODIFICATION OF AN ASR LEXICON OF AN ASR ENGINE

BACKGROUND OF THE INVENTION

1. Field of the Invention

The field of the invention is data processing, or, more specifically, methods, apparatus, and products for providing oral modification of an automatic speech recognition ('ASR') lexicon of an ASR engine.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

Current lightweight voice solutions require a developer to build a grammar and lexicon to limit the potential number of words that an ASR engine must recognize—as a means for increasing accuracy. This approach is naturally limiting because one or more elements of the grammar may not be properly accounted for in the lexicon.

The current state of the art allows for correction of improperly recognized words given a graphical user interface ('GUI'), for example in fairly mature versions of IBM Via-Voice, Dragon NaturallySpeaking, and L&H VoiceXpress, starting around 1998. If a user dictated something like "Call Martha tomorrow" and the system recognized "Call Marsha tomorrow", then the user could correct Marsha by double-clicking Marsha on the GUI and selecting an alternative from a pop-up list. The user could select Marsha orally with "Select Marsha" or "Correct Marsha". If Marsha was out of grammar, the user could command the system to allow the user to voice spell 'Marsha' and add it to the grammar, all of which in prior art systems required a complex sequence of GUI commands or voice commands.

It is desirable in voice-enabled systems for the oral interactions to approximate human conversation. Where the user is required to select the improperly recognized word through GUI operations, there is no analog for correcting the error solely by interacting orally. Where the user is provided voice commands for correction, current state of the art presents an interaction model that is more segmented than would be expected of normal human conversation.

SUMMARY OF THE INVENTION

Methods, apparatus, and computer program products are described for providing oral modification of an ASR lexicon of an ASR engine that include receiving, in the ASR engine from a user through a multimodal application, speech for recognition, where the ASR engine includes an ASR lexicon of words capable of recognition by the ASR engine, and the ASR lexicon does not contain at least one word of the speech for recognition; indicating by the ASR engine through the multimodal application to the user that the ASR lexicon does not contain the word; receiving by the ASR engine from the user through the multimodal application an oral instruction to add the word to the ASR lexicon, where the oral instruction is accompanied by an oral spelling of the word from the user; and executing the instruction by the ASR engine.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
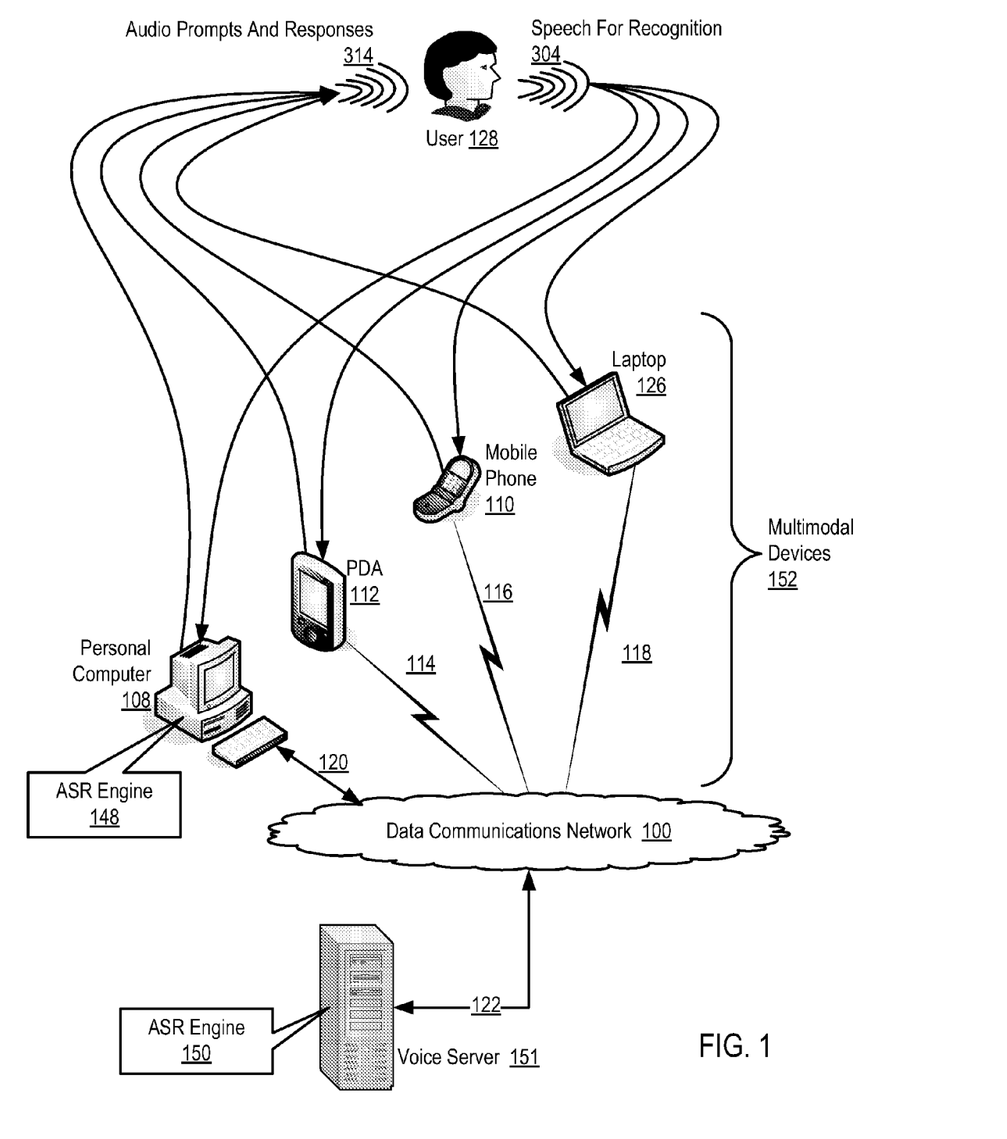
FIG. 1 sets forth a network diagram illustrating an exemplary system for providing oral modification of an ASR lexicon of an ASR engine according to embodiments of the present invention.

Exemplary methods, apparatus, and products for providing oral modification of an ASR lexicon of an ASR engine according to embodiments of the present invention are described with reference to the accompanying drawings, beginning with FIG. 1. FIG. 1 sets forth a network diagram illustrating an exemplary system for providing oral modification of an ASR lexicon of an ASR engine according to embodiments of the present invention. The system of FIG. 1 operates generally to providing oral modification of an ASR lexicon of an ASR engine according to embodiments of the present invention by receiving, in an ASR engine from a user through a multimodal application, speech for recognition, where the ASR engine includes an ASR lexicon of words capable of recognition by the ASR engine, and the ASR lexicon does not contain at least one word of the speech for recognition; indicating by the ASR engine through the multimodal application to the user that the ASR lexicon does not contain the word; receiving by the ASR engine from the user through the multimodal application an oral instruction to add the word to the ASR lexicon, where the oral instruction is accompanied by an oral spelling of the word from the user; and executing the instruction by the ASR engine.

A multimodal device is an automated device, that is, automated computing machinery or a computer program running on an automated device, that is capable of accepting speech input from a user, digitizing speech, and providing digitized speech to an ASR engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art.

The system of FIG. 1 includes several example multimodal devices:

- personal computer (108) which is coupled for data communications to data communications network (100) through wireline connection (120),
- personal digital assistant ('PDA') (112) which is coupled for data communications to data communications network (100) through wireless connection (114),
- mobile telephone (110) which is coupled for data communications to data communications network (100) through wireless connection (116), and
- laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (304), digitizing the speech, and providing the digitized speech to an ASR engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for providing oral modification of an ASR lexicon of an ASR engine according to embodiments of the present invention may be encoded with any codec, including, for example:

- AMR (Adaptive Multi-Rate Speech coder)
- ARDOR (Adaptive Rate-Distortion Optimized sound codeR),
- Dolby Digital (A/52, AC3),
- DTS (DTS Coherent Acoustics),
- MP1 (MPEG audio layer-1),
- MP2 (MPEG audio layer-2) Layer 2 audio codec (MPEG-1, MPEG-2 and non-ISO MPEG-2.5),
- MP3 (MPEG audio layer-3) Layer 3 audio codec (MPEG-1, MPEG-2 and non-ISO MPEG-2.5),
- Perceptual Audio Coding,
- FS-1015 (LPC-10),
- FS-1016 (CELP),
- G.726 (ADPCM),
- G.728 (LD-CELP),
- G.729 (CS-ACELP),
- GSM,
- HILN (MPEG-4 Parametric audio coding), and
- others as may occur to those of skill in the art.

An ASR engine (148) may be installed locally in the multimodal device itself, or an ASR engine (150) may be installed remotely with respect to the multimodal device, across a data communications network (100) in a voice server (151). Each of the example multimodal devices (152) in the system of FIG. 1 is capable of providing oral modification of an ASR lexicon of an ASR engine according to embodiments of the present invention by providing speech for recognition from a user to an ASR engine that includes an ASR lexicon of words capable of recognition by the ASR engine, where the ASR lexicon does not contain at least one word of the speech for recognition; receiving and passing on to the user an indication from the ASR engine that the ASR lexicon does not contain the word; providing, to the ASR engine from the user for execution by the ASR engine, an oral instruction to add the word to the ASR lexicon, with the oral instruction accompanied by an oral spelling of the word from the user. The ASR engine then executes the instruction to add the word to the lexicon.

The use of these four example multimodal devices (152) is for explanation only, not for limitation of the invention. Any automated computing machinery capable of accepting speech from a user, providing the speech digitized to an ASR engine, and receiving and playing speech prompts and responses from the voice server may be improved to function as a multimodal device for providing oral modification of an ASR lexicon of an ASR engine according to embodiments of the present invention.

The system of FIG. 1 also includes a voice server (151) which is connected to data communications network (100) through wireline connection (122). The voice server (151) is a computer that runs a VoiceXML interpreter that provides voice recognition services for multimodal devices by accepting requests for speech recognition and returning text representing recognized speech. Voice server (151) also provides text to speech ('TTS') conversion for voice prompts and voice responses (314) to user input in multimodal applications such as, for example, X+V applications or Java Speech applications.

The system of FIG. 1 includes a data communications network (100) that connects the multimodal devices (152) and the voice server (151) for data communications. A data communications network for providing oral modification of an ASR lexicon of an ASR engine according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The arrangement of the voice server (151), the multimodal devices (152), and the data communications network (100) making up the exemplary system illustrated in FIG. 1 are for explanation, not for limitation. Data processing systems useful for providing oral modification of an ASR lexicon of an ASR engine according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above.

Various embodiments of the present invention may be implemented on a variety of hardware platforms in addition to those illustrated in FIG. 1.

Providing oral modification of an ASR lexicon of an ASR engine according to embodiments of the present invention in some embodiments may be implemented with one or more voice servers, computers, that is, automated computing machinery, that provide speech recognition. For further explanation, therefore, FIG. 2 sets forth a block diagram of automated computing machinery comprising an example of a computer useful as a voice server (151) in providing oral modification of an ASR lexicon of an ASR engine according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Figure 2:
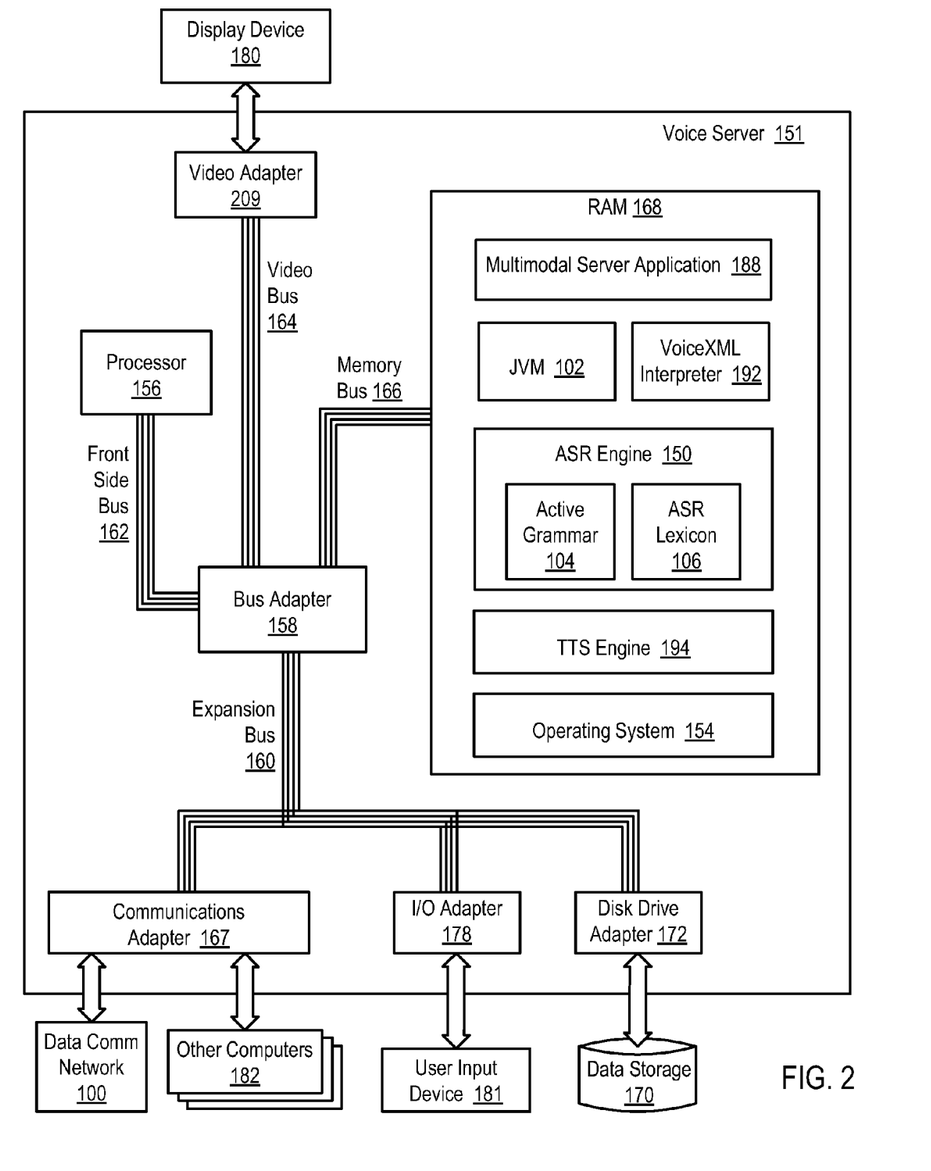
FIG. 2 sets forth a block diagram of automated computing machinery comprising an example of a computer useful as a voice server in providing oral modification of an ASR lexicon of an ASR engine according to embodiments of the present invention.

Stored in RAM (168) is a multimodal server application (188), a module of computer program instructions capable of operating a voice server in a system that supports providing oral modification of an ASR lexicon of an ASR engine according to embodiments of the present invention. Multimodal server application (188) provides voice recognition services for multimodal devices by accepting requests for speech recognition and returning speech recognition results, including text representing recognized speech, text for use as variable values in dialogs, and text as string representations of scripts for semantic interpretation. Multimodal server application (188) also includes computer program instructions that provide text-to-speech ('TTS') conversion for voice prompts and voice responses to user input in multimodal applications such as, for example, X+V applications or Java Speech applications.

Multimodal server application (188) typically is a user-level, multimodal, server-side computer program. Multimodal server application (188) may, for example, be implemented with a set of VoiceXML documents which taken together comprise a VoiceXML application. Multimodal server application (188) may, for example, be implemented as a web server that supports X+V by providing responses to HTTP requests from X+V clients. Multimodal server application (188) may, for a further example, be implemented as a Java server that runs on a Java Virtual Machine (102) and supports a Java voice framework by providing responses to HTTP requests from Java client applications running on multimodal devices. And multimodal server applications that support providing oral modification of an ASR lexicon of an ASR engine may be implemented in other ways as may occur to those of skill in the art, and all such ways are well within the scope of the present invention.

The multimodal server application (188) in this example is configured to receive speech for recognition from a user and pass the speech along to an ASR engine (150). ASR engine (150) is a module of computer program instructions, also stored in RAM in this example, that includes an ASR lexicon (106) of words capable of recognition by the ASR engine. The lexicon (106) is an association of words in text form with phonemes representing pronunciations of each word. In normal speech recognition, the ASR engine receives speech for recognition in the form of at least one digitized word, use frequency components of the digitized word to derive a Speech Feature Vector ('SFV'), uses the SFV to infer phonemes for the word from a language-specific acoustic model. A language-specific acoustic model is a data structure, a table or database, for example, that associates SFVs with phonemes representing, to the extent that it is practically feasible to do so, all pronunciations of all the words in a particular language. The ASR engine then uses the phonemes to find the word in the lexicon.

Whether the word is found may be a statistical decision, a decision made on the basis of a best fit over a threshold, for example. If the pronunciation of a word includes ten phonemes and the lexicon contains a word with nine matching phonemes, the ASR engine may return that word as a match, and the word so recognized may in fact not the word that was submitted as speech for recognition. It will sound almost the same, but many different words sound much alike. If the threshold were taken as no more than one mismatched phoneme, and the best match only had eight out of ten matching phonemes, the ASR engine then may report 'no match,' effectively concluding that the speech submitted for recognition cannot be recognized.

The ASR engine (150) contains an active grammar (104). A grammar is a way of communicating to an ASR engine the words and sequences of words that may be recognized. Grammars for use in providing oral modification of an ASR lexicon of an ASR engine according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
   #JSGF V1.0;
   grammar command;
   <command> = [remind me to] call | phone | telephone <name>
   <when>;
   <name> = bob | martha | joe | pete | chris | john | artoush;
   <when> = today | this afternoon | tomorrow | next week;
   ]]>
</grammar>
```

In this example, the elements named <command>, <name>, and <when> are rules of the grammar. Rules are a combination of a rulename and an expansion of a rule that advises an ASR engine which words presently can be recognized. In this example, expansion includes conjunction and disjunction, and the vertical bars '|' mean 'or.'

An ASR engine processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole accepts utterances like these, for example:

'phone bob next week,'
'telephone martha this afternoon,'
'remind me to call chris tomorrow,' and
'remind me to phone pete today.'

Each grammar has a scope during which the grammar is active, and an ASR engine typically recognizes words only from active grammars. Scopes may overlap, and one or more grammars may be active at the same time. Some grammars, such as <help> grammars for example, may be active whenever a multimodal application is running. Others may be active only during a particular dialog or even only during data entry for a single field.

This paragraph and the next paragraph describe in general terms how grammars are scoped in VoiceXML and X+V. Multimodal applications in other technologies may scope grammars in other ways, all of which are within the scope of the present invention. In VoiceXML, applications are organized in documents characterized as one root document for the application and zero or more leaves. Dialogs are expressed in the documents. A 'scope' attribute in a dialog sets the default scope of the grammars used in the dialog. If dialog scope is set to 'dialog,' then the dialog grammars are active only during the dialog. If dialog scope is 'document,' then a grammar in the dialog is active during any dialog in the same document. If the dialog scope is set to 'document' and the document is an application root document, then the dialog grammars are active during any dialog in any document of the application. The scope of individual grammars takes precedence over the default scope; for example, if in a non-root document a dialog with the default scope 'dialog' has a grammar in the dialog with the scope 'document,' then that grammar is active in any dialog in the document.

X+V grammar processing is carried out by submitting a dialog containing grammars to a VoiceXML interpreter for processing—so that in effect, a dialog so submitted appears to the VoiceXML interpreter as an entire application. This has the general effect of limiting most X+V grammar scopes to 'dialog.'

When received speech for recognition includes a word that is not in the ASR lexicon, the ASR engine is configured to indicate, explicitly or implicitly, to a user through the multimodal server application that the ASR lexicon does not contain the word. Returning the wrong word implicitly advises a user that the word in the speech for recognition is not in the lexicon, because the best match for its phonemes in the lexicon is not the word submitted for recognition. Returning 'no match' explicitly advises that the word is not in the lexicon. The multimodal server application (188) advises the user of a remotely connected multimodal device of the missing word, explicitly by reporting the lack of a match in the lexicon, or implicitly by returning an incorrect result.

The ASR engine is also configured to receive from the user through the multimodal application an oral instruction to add the word to the ASR lexicon, where the oral instruction is accompanied by an oral spelling of the word from the user. The ASR engine receives the word as spelled in the form of text.

The ASR engine also is configured to execute the instruction to add the word to the ASR lexicon. The ASR engine adds the word to the lexicon by first passing the word through a TTS engine to obtain a time-domain digitized form of the word. The ASR engine then converts the digitized word to the frequency domain, for example, by use of a Fast Fourier Transform. The ASR engine then defines an SFV by use of a portion of the frequency components of the frequency domain representation of the word, for example, by taking the first twelve or thirteen frequency components of the frequency domain representation as an SFV. The ASR engine then infers phonemes for the word from a language-specific acoustic model. The ASR engine then inserts the text form of the word and the phonemes for the word in the lexicon. Now the next time the word is received in the ASR engine as part of speech for recognition, recognition will not fail because the word is not in the lexicon.

Also stored in RAM is a VoiceXML interpreter (192), a module of computer program instructions that processes VoiceXML grammars. VoiceXML input to VoiceXML interpreter (192) may originate from VoiceXML clients running remotely on multimodal devices, from X+V clients running remotely on multimodal devices, or from Java client applications running remotely on multimedia devices. In this example, VoiceXML interpreter (192) interprets and executes VoiceXML segments received from remote multimedia clients and provided to VoiceXML interpreter (192) through multimodal server application (188).

Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

TTS Engine (194) also supports providing oral modification of an ASR lexicon of an ASR engine according to embodiments of the present invention by providing a time-domain digitized form of a word spelled by a user to be added to the ASR lexicon (106).

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), multimodal server application (188), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for providing oral modification of an ASR lexicon of an ASR engine according to embodiments of the present invention include modems for wired dial-up communications, Ethernet (IEEE 802.3) adapters for wired data communications network communications, and 802.11 adapters for wireless data communications network communications.

Providing oral modification of an ASR lexicon of an ASR engine according to embodiments of the present invention is generally implemented with one or more multimodal devices, that is, automated computing machinery or computers. In the system of FIG. 1, for example, all the multimodal devices are implemented to some extent at least as computers. For further explanation, therefore, FIG. 3 sets forth a block diagram of automated computing machinery comprising an example of a computer useful as a multimodal device (152) in providing oral modification of an ASR lexicon of an ASR engine according to embodiments of the present invention. The multimodal device (152) of FIG. 3 includes at least one computer processor (156) or 'CPU' as well as random access memory (168) ('RAM') which is connected through a high speed memory bus (166) and bus adapter (158) to processor (156) and to other components of the multimodal device.

Figure 3:
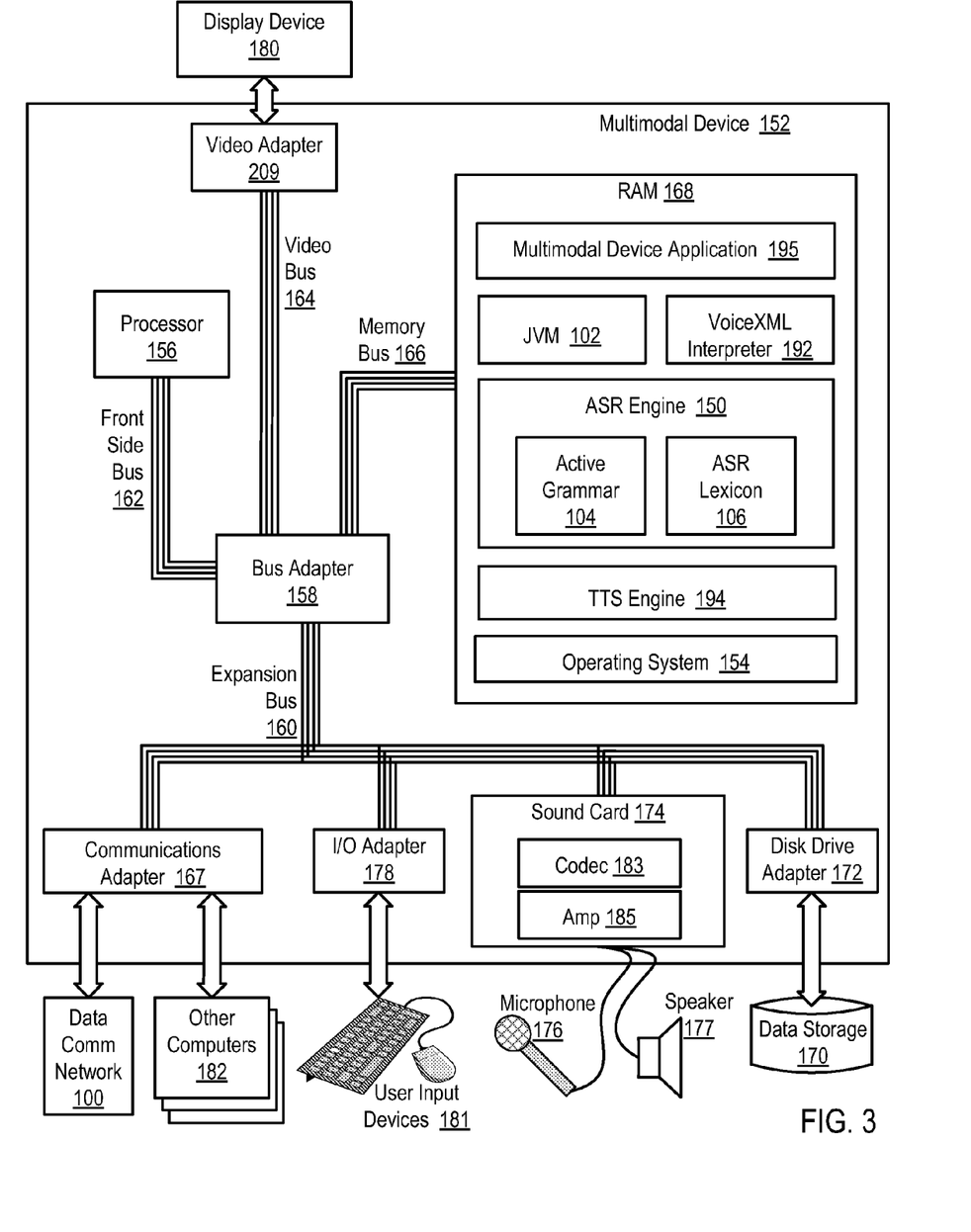
FIG. 3 sets forth a block diagram of automated computing machinery comprising an example of a computer useful as a multimodal device in providing oral modification of an ASR lexicon of an ASR engine according to embodiments of the present invention.

Stored in RAM (168) is a multimodal device application (195), a module of computer program instructions capable of operating a multimodal device as an apparatus that supports providing oral modification of an ASR lexicon of an ASR engine according to embodiments of the present invention. The multimodal device application (195) accepts speech for recognition from a user and sends the speech for recognition through API calls to an ASR engine. When the ASR engine cannot recognize a word because the word is not available in a lexicon of the ASR engine, the multimodal device application passes to the user from the ASR engine an indication that the ASR lexicon does not contain the word. The multimodal device application (195) also receives and passes through API calls to the ASR engine from the user an oral instruction to add such a missing word to the ASR lexicon, where the oral instruction is accompanied by an oral spelling of the word from the user. The multimodal device application (195) instructs the ASR engine through such API calls to execute the instruction to add a missing word to the lexicon.

Multimodal device application (195) typically is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal device application may be a Java voice application that itself process grammars and provides active grammars and digitized speech for recognition directly through an API to an ASR engine (150). Or the multimodal device application may be an X+V application running in a browser or microbrowser that passes VoiceXML grammars through API calls directly to an embedded VoiceXML interpreter (192) for processing. The embedded VoiceXML interpreter (192) may in turn issue requests for speech recognition through API calls directly to an embedded ASR engine (150). Multimodal device application (195) also provides TTS conversion by API calls to an embedded TTS engine (194) for voice prompts and voice responses to user input in multimodal applications such as, for example, X+V applications or Java voice applications. The multimodal device application (195) in this example does not sent speech for recognition across a network to a voice server for recognition, and the multimodal device application (195) in this example does not receive TTS prompts and responses across a network from a voice server. All grammar processing, voice recognition, and text to speech conversion is performed in an embedded fashion in the multimodal device itself.

ASR engine (150), also stored in RAM in this example, is a module of computer program instructions for carrying out automated speech recognition. An example of an embedded ASR engine that may be improved for providing oral modification of an ASR lexicon of an ASR engine according to embodiments of the present invention is IBM's Embedded ViaVoice Enterprise, an ASR product that also includes an embedded TTS engine. The ASR engine (150) includes an active grammar (104) that in turn as described above includes rules defining which words and sequences of words are presently scoped for recognition. The ASR engine (150) includes an ASR lexicon (106) of words capable of recognition by the ASR engine.

The embedded ASR engine (150) in the example of FIG. 3 is configured to operate in a manner similar to the ASR engine in the voice server in the example of FIG. 2. When speech for recognition includes a word that is not in the ASR lexicon, the embedded ASR engine is configured to indicate, explicitly or implicitly, to a user through the multimodal device application that the ASR lexicon does not contain the word. Returning the wrong word implicitly advises a user that the word in the speech for recognition is not in the lexicon, because the best match for its phonemes in the lexicon is not the word submitted for recognition. Returning 'no match' explicitly advises that the word is not in the lexicon. The multimodal device application (195) advises the user of a remotely connected multimodal device of the missing word, explicitly by reporting the lack of a match in the lexicon, or implicitly by returning an incorrect result.

The embedded ASR engine is also configured to receive from the user through the multimodal application an oral instruction to add the word to the ASR lexicon, where the oral instruction is accompanied by an oral spelling of the word from the user. The ASR engine receives the word as spelled in the form of text. The embedded ASR engine also is configured to execute the instruction to add the word to the ASR lexicon. The embedded ASR engine adds the word to the lexicon by passing the word through a TTS engine to obtain a time-domain digitized form of the word, converting the digitized word to the frequency domain, defining an SFV for the word, inferring phonemes for the word from a language-specific acoustic model, and inserting the text form of the word and the phonemes for the word into the lexicon.

Also stored in RAM (168) is an embedded TTS Engine (194), a module of computer program instructions that accepts text as input and returns the same text in the form of digitally encoded speech, for use in providing speech as prompts for and responses to users of multimodal systems. TTS Engine (194) also supports providing oral modification of an ASR lexicon of an ASR engine according to embodiments of the present invention by providing a time-domain digitized form of a word spelled by a user to be added to the ASR lexicon (106).

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), multimodal device application (195), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

The multimodal device (152) of FIG. 3 includes a bus adapter (158), a computer hardware component that contains drive electronics for the high speed buses, the front side bus (162), the video bus (164), and the memory bus (166), as well as for the slower expansion bus (160). Examples of bus adapters useful in multimodal devices according to embodiments of the present invention include the Intel Northbridge, the Intel Memory Controller Hub, the Intel Southbridge, and the Intel I/O Controller Hub. Examples of expansion buses useful in multimodal devices according to embodiments of the present invention include Industry Standard Architecture ('ISA') buses and Peripheral Component Interconnect ('PCI') buses.

Multimodal device (152) of FIG. 3 includes disk drive adapter (172) coupled through expansion bus (160) and bus adapter (158) to processor (156) and other components of the multimodal device (152). Disk drive adapter (172) connects non-volatile data storage to the multimodal device (152) in the form of disk drive (170). Disk drive adapters useful in multimodal devices include Integrated Drive Electronics ('IDE') adapters, Small Computer System Interface ('SCSI') adapters, and others as will occur to those of skill in the art. In addition, non-volatile computer memory may be implemented for a multimodal device as an optical disk drive, electrically erasable programmable read-only memory space (so-called 'EEPROM' or 'Flash' memory), RAM drives, and so on, as will occur to those of skill in the art.

The example multimodal device of FIG. 3 includes one or more input/output ('I/O') adapters (178). I/O adapters in multimodal devices implement user-oriented input/output through, for example, software drivers and computer hardware for controlling output to display devices such as computer display screens, as well as user input from user input devices (181) such as keyboards and mice. The example multimodal device of FIG. 3 includes video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example multimodal device of FIG. 3 also includes sound card (174), which is an example of an I/O adapter specially designed for accepting analog audio signals from a microphone (176) and converting the audio analog signals to digital form for further processing by a codec (183). Sound card (174) is connected to processor (156) through expansion bus (160), bus adapter (158), and front side bus (162).

The exemplary multimodal device (152) of FIG. 3 includes a communications adapter (167) for data communications with other computers (182) and for data communications with data communications network (100). Such data communications may be carried out through serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for providing oral modification of an ASR lexicon of an ASR engine according to embodiments of the present invention include modems for wired dial-up communications, Ethernet (IEEE 802.3) adapters for wired data communications network communications, and 802.11b adapters for wireless data communications network communications.

Figure 4:
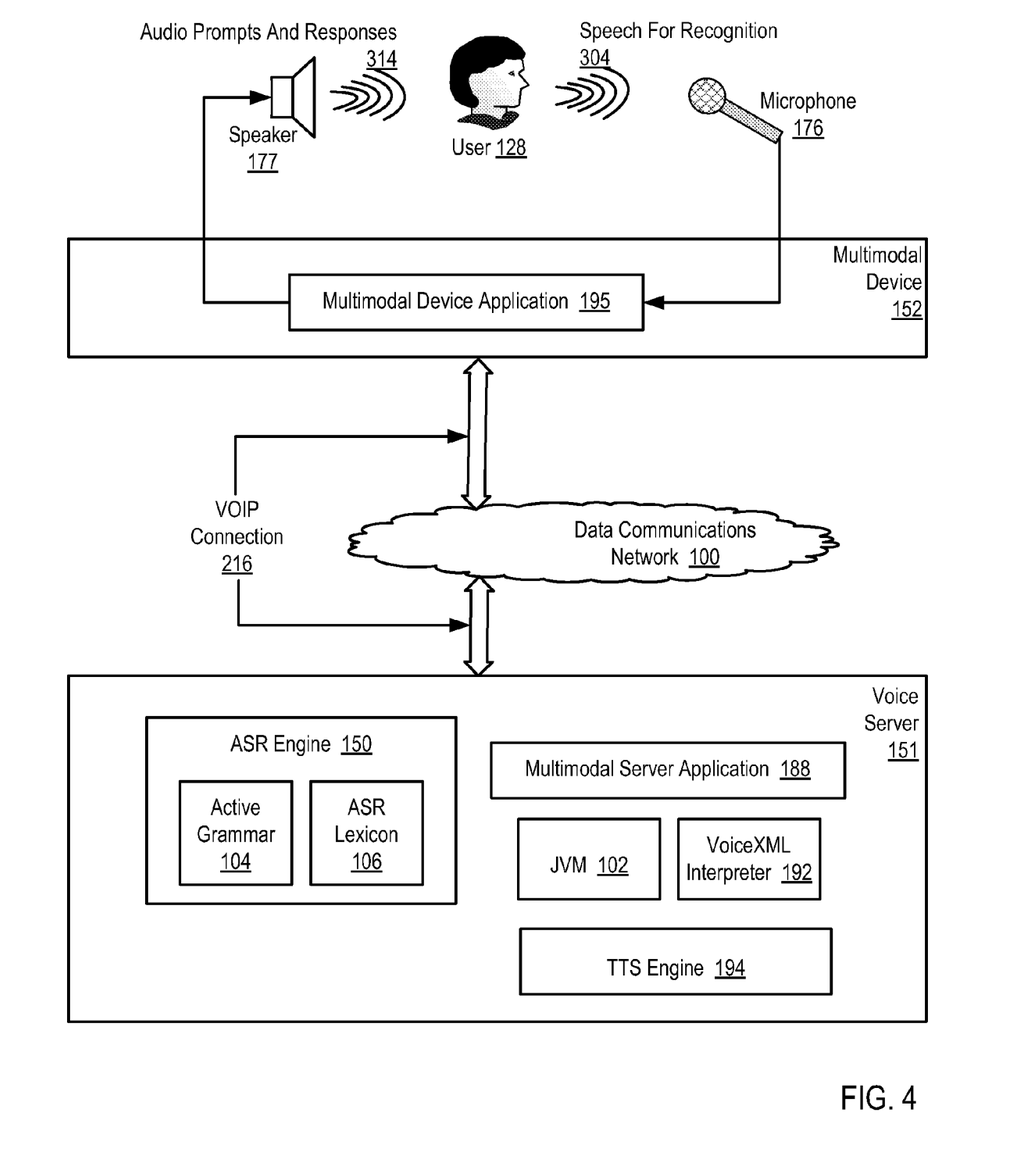
FIG. 4 sets forth a functional block diagram of exemplary apparatus for providing oral modification of an ASR lexicon of an ASR engine according to embodiments of the present invention.

For further explanation, FIG. 4 sets forth a functional block diagram of exemplary apparatus for providing oral modification of an ASR lexicon of an ASR engine according to embodiments of the present invention. The example of FIG. 4 includes a multimodal device (152) and a voice server (151) connected for data communication by a VOIP connection (216) through a data communications network (100). A multimodal device application (195) runs on the multimodal device (152), and a multimodal server application (188) runs on the voice server (151). The voice server (151) also has installed upon it an ASR engine (150) with an active grammar (104) and an ASR lexicon (106), a JVM (102), and a Voice XML interpreter (192).

VOIP, standing for 'Voice Over Internet Protocol,' is a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to Connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 4 operates in manner that is similar to the operation of the system of FIG. 2 described above. Multimodal device application (195) presents a voice interface to user (128), providing audio prompts and responses (314) and accepting speech for recognition (304). Multimodal device application (195) digitizes the speech for recognition according to some codec, packages the speech in a recognition request message according to a VOIP protocol, and transmits the speech to voice server (151) through the VOIP connection (216) on the network (100). Multimodal server application (188) provides voice recognition services for multimodal devices by accepting requests for speech recognition and returning speech recognition results, including text representing recognized speech, text for use as variable values in dialogs, and text as string representations of scripts for semantic interpretation. Multimodal server application (188) includes computer program instructions that provide text-to-speech ('TTS') conversion for voice prompts and voice responses to user input in multimodal applications such as, for example, X+V applications or Java Speech applications.

The multimodal server application (188) receives speech for recognition from a user and passes the speech to an ASR engine (150) for recognition. The ASR engine receives digitized speech for recognition, uses frequency components of the digitized speech to derive an SFV, uses the SFV to infer phonemes for the word from a language-specific acoustic model (not shown), and uses the phonemes to find the speech in the lexicon (106).

When received speech for recognition includes a word that is not in the ASR lexicon, the ASR engine is configured to indicate, explicitly or implicitly, to a user through the multimodal server application that the ASR lexicon does not contain the word. Returning the wrong word implicitly advises a user that the word in the speech for recognition is not in the lexicon, because the best match for its phonemes in the lexicon is not the word submitted for recognition. Returning 'no match' explicitly advises that the word is not in the lexicon. The multimodal server application (188) advises the user of a remotely connected multimodal device of the missing word, explicitly by reporting the lack of a match in the lexicon, or implicitly by returning an incorrect result.

The ASR engine is also configured to receive from the user through the multimodal device application (195) and the multimodal server application (188) an oral instruction to add the word to the ASR lexicon, where the oral instruction is accompanied by an oral spelling of the word from the user. The ASR engine receives the word as spelled in the form of text.

The ASR engine also is configured to execute the instruction to add the word to the ASR lexicon. The ASR engine adds the word to the lexicon by passing the word through a TTS engine (194) to obtain a time-domain digitized form of the word, converting the digitized word to the frequency domain, defining an SFV with some of the frequency components of the frequency domain representation of the word, inferring phonemes for the word from a language-specific acoustic model, and inserting the text form of the word and the phonemes for the word into the lexicon (106).

VoiceXML interpreter (192) is a module of computer program instructions that processes VoiceXML grammars. In this example, VoiceXML interpreter (192) interprets and executes VoiceXML grammars received from the multimodal device application and provided to VoiceXML interpreter (192) through multimodal server application (188). VoiceXML input to VoiceXML interpreter (192) may originate from the multimodal device application (195) implemented as a VoiceXML client running remotely the multimodal device (152), from the multimodal device application (195) implemented as an X+V client running remotely on the multimodal device (152), or from the multimedia device application (195) implemented as a Java client application running remotely on the multimedia device (152).

The TTS Engine (194) is a module of computer program instructions that in addition to providing digitized speech for use as prompts for and responses (314) to user (128), also supports providing oral modification of an ASR lexicon of an ASR engine according to embodiments of the present invention by providing a time-domain digitized form of a word spelled by a user to be added to the ASR lexicon (106).

Figure 5:
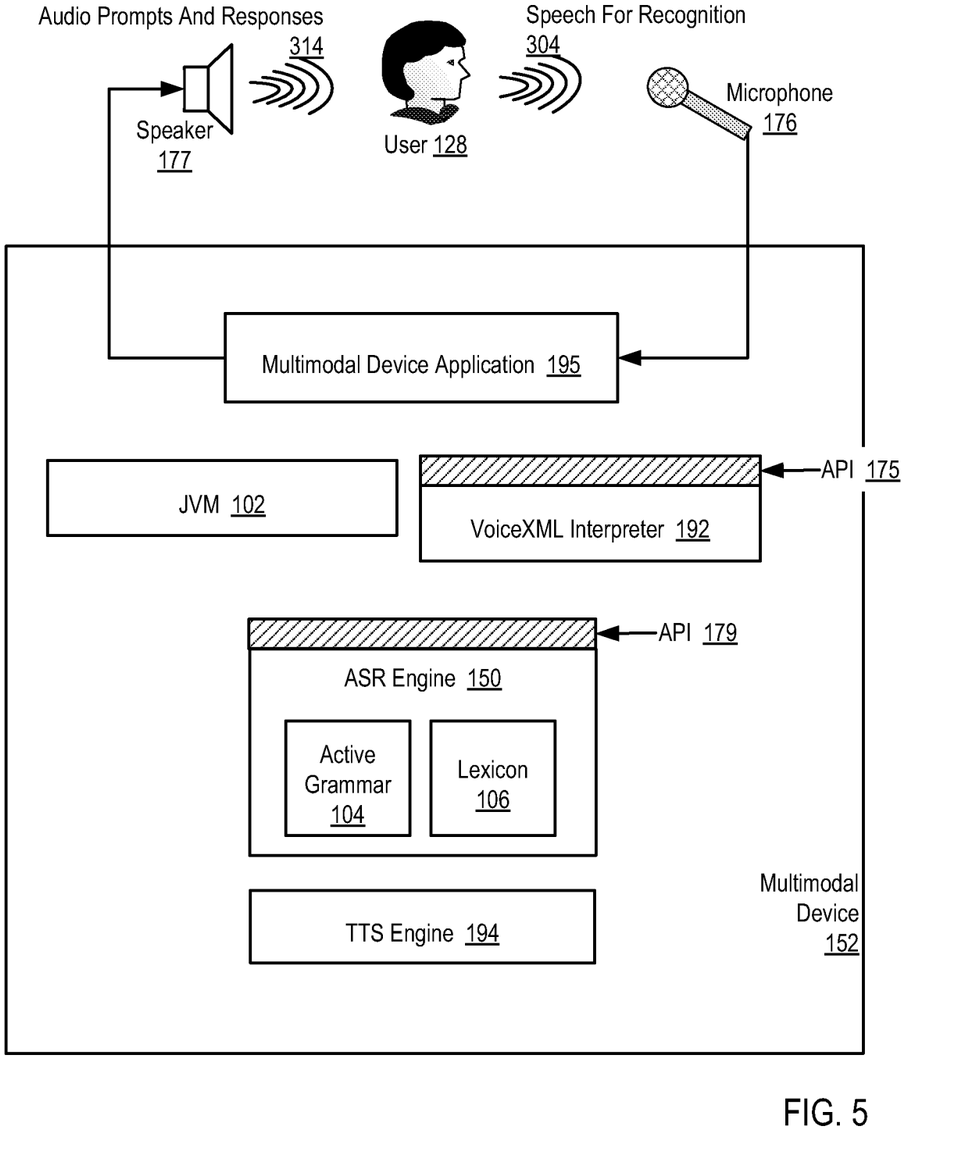
FIG. 5 sets forth a functional block diagram of further exemplary apparatus for providing oral modification of an ASR lexicon of an ASR engine according to embodiments of the present invention.

For further explanation, FIG. 5 sets forth a functional block diagram of further exemplary apparatus for providing oral modification of an ASR lexicon of an ASR engine according to embodiments of the present invention. In the example of FIG. 5, there is only a multimodal device (152) and a user (128), no network, no VOIP connection, and no voice server containing a remote ASR engine. All the components needed for providing oral modification of an ASR lexicon of an ASR engine according to embodiments of the present invention are installed or embedded in the multimodal device itself, a laptop, a PDA, a cell phone, or the like.

The apparatus of FIG. 5 operates in a manner similar to the system of FIG. 3. Multimodal device application (195) is a module of computer program instructions capable of operating a multimodal device as an apparatus that provides oral modification of an ASR lexicon of an ASR engine according to embodiments of the present invention. The multimodal device application (195) accepts speech for recognition from a user and sends the speech for recognition through API (179) to an embedded ASR engine (150). When the embedded ASR engine cannot recognize a word because the word is not available in a lexicon of the ASR engine, the multimodal device application passes to the user (128) from the ASR engine an indication that the ASR lexicon does not contain the word. The multimodal device application (195) also receives and passes through API (179) to the embedded ASR engine (150) from the user an oral instruction to add such a missing word to the ASR lexicon. In this example, such an oral instruction is accompanied by an oral spelling of the word from the user. The multimodal device application (195) instructs the ASR engine through API (179) to execute the instruction to add a missing word to the lexicon.

Multimodal device application (195) is a user-level, multimodal, client-side computer program that provides a speech interface through which a user may provide oral speech for recognition through microphone (176), have the speech digitized through an audio amplifier and a codec, and provide the digitized speech for recognition to the embedded ASR engine (150). The multimodal device application may be a Java voice application that itself process grammars and provides active grammars and digitized speech for recognition directly through API (179) to the embedded ASR engine (150). Or the multimodal device application may be an X+V application running in a browser or microbrowser that passes VoiceXML grammars through API (175) to an embedded VoiceXML interpreter (192) for processing. The embedded VoiceXML interpreter (192) may in turn issue requests for speech recognition through API (179) to the embedded ASR engine (150). Multimodal device application (195) also provides TTS conversion by API calls to an embedded TTS engine (194) for voice prompts and voice responses to user input in multimodal applications such as, for example, X+V applications or Java voice applications. The multimodal device application (195) in this example does not send speech for recognition across a network to a voice server for recognition, and the multimodal device application (195) in this example does not receive TTS prompts and responses across a network from a voice server. All grammar processing, voice recognition, and text to speech conversion is performed in an embedded fashion in the multimodal device itself.

Embedded ASR engine (150) is a module of computer program instructions for carrying out automated speech recognition. As mentioned, IBM's Embedded ViaVoice Enterprise, an ASR product that also includes an embedded TTS engine, is an example of an embedded ASR engine that may be improved for providing oral modification of an ASR lexicon of an ASR engine according to embodiments of the present invention. The ASR engine (150) includes an active grammar (104) that in turn includes rules defining which words and sequences of words are presently scoped for recognition. The ASR engine (150) includes an ASR lexicon (106) of words capable of recognition by the ASR engine.

When speech for recognition includes a word that is not in the ASR lexicon, the embedded ASR engine is configured to indicate, explicitly or implicitly, to a user through the multimodal device application that the ASR lexicon does not contain the word. Returning the wrong word implicitly advises a user that the word in the speech for recognition is not in the lexicon, because the best match for its phonemes in the lexicon is not the word submitted for recognition. Returning 'no match' explicitly advises that the word is not in the lexicon. The multimodal device application (195) advises the user of a remotely connected multimodal device of the missing word, explicitly by reporting the lack of a match in the lexicon, or implicitly by returning an incorrect result.

The embedded ASR engine is also configured to receive from the user through the multimodal application an oral instruction to add the word to the ASR lexicon, where the oral instruction is accompanied by an oral spelling of the word from the user. The ASR engine receives the word as spelled in the form of text. The embedded ASR engine also is configured to execute the instruction to add the word to the ASR lexicon. The embedded ASR engine adds the word to the lexicon by passing the word through a TTS engine to obtain a time-domain digitized form of the word, converting the digitized word to the frequency domain, defining an SFV for the word, inferring phonemes for the word from a language-specific acoustic model, and inserting the text form of the word and the phonemes for the word into the lexicon.

The embedded TTS Engine (194) is a module of computer program instructions that in addition to providing digitized speech for use as prompts for and responses to user (128), also supports providing oral modification of an ASR lexicon of an ASR engine according to embodiments of the present invention by providing a time-domain digitized form of a word spelled by a user to be added to the ASR lexicon (106).

Figure 6:
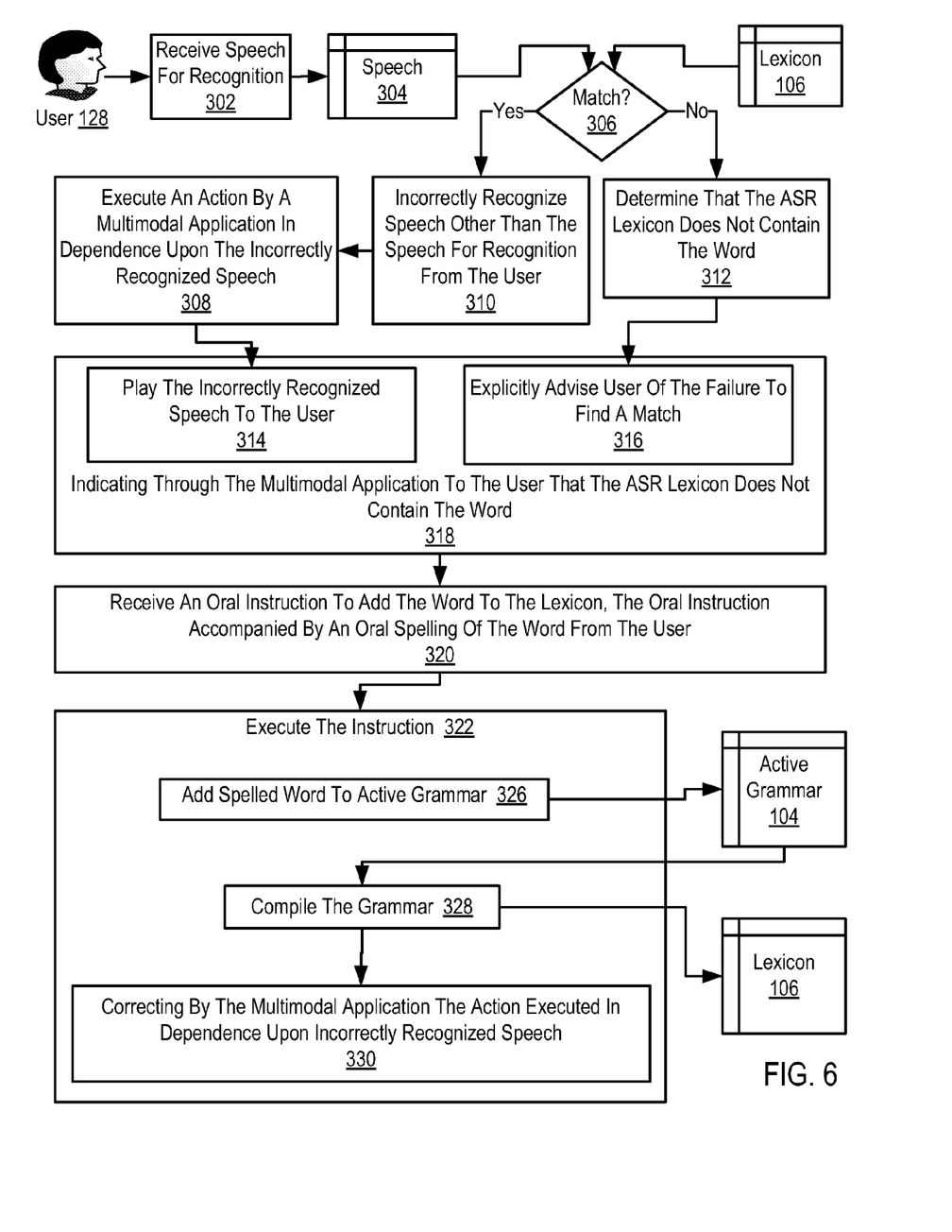
FIG. 6 sets forth a flow chart illustrating an exemplary method of providing oral modification of an ASR lexicon of an ASR engine according to embodiments of the present invention.

For further explanation, FIG. 6 sets forth a flow chart illustrating an exemplary method of providing oral modification of an ASR lexicon of an ASR engine according to embodiments of the present invention. The method of FIG. 6 includes receiving (302), in an ASR engine from a user (128) through a multimodal application, speech (304) for recognition. In this example, the ASR engine includes an ASR lexicon (106) of words capable of recognition by the ASR engine, and the ASR lexicon does not contain at least one word of the speech for recognition. In this example, the multimodal application and the ASR engine are not shown. In this example, the multimodal application may be a multimodal device application running on a multimodal device with an embedded ASR engine, or the multimodal application may be a multimodal server application running on a voice server that includes an ASR engine. The various architectures are explained in detail above in this specification. Most of the steps of the method of FIG. 6 are executed in or caused by an ASR engine.

The method of FIG. 6 also includes indicating (318) by the ASR engine through the multimodal application to the user (128) that the ASR lexicon does not contain the word. There are two ways of so indicating illustrated in the method of FIG. 6. The first alternative is that the speech engine may incorrectly recognize (310) speech other than the speech for recognition from the user. As explained above, whether a word in the lexicon matches (306) a word in speech for recognition may be a statistical decision that can go wrong. An incorrect word may match well enough to satisfy some predetermined statistical threshold and, in the absence of a perfect match, be incorrectly recognized. If a word is incorrectly recognized, a multimodal application may execute an action, that is, an incorrect action, in dependence upon the incorrectly recognized speech. Now at this point in processing, the ASR engine and the multimodal application have no idea that anything has gone wrong. So the indication to the user that something has gone wrong is implicit. The multimodal application plays (314) the incorrectly recognized speech to the user. For example, consider this dialog, where the lexicon contains 'Martina' and 'Marinela,' but no 'Martha':

FRANK: "Remind me to call Martha at 10 pm"
MULTIMODAL DEVICE: "I've just set a reminder to for you to call Martina at 10 pm."

A second alternative way of indicating (318) to the user (128) that the ASR lexicon does not contain a word is available when the ASR engine determines (312) that the ASR lexicon does not contain the word. That is, the ASR engine finds no word in the lexicon that meets any statistical test for a match and concludes that no match is available. In this case, the ASR engine may report 'no match' and cause the multimodal engine to explicitly advise (316) the user of the failure to find a match. For example, FRANK: "Remind me to call Martha at 10 pm."
MULTIMODAL DEVICE: "Sorry, but I do not recognize the name Martha."

The method of FIG. 6 also includes receiving (320) by the ASR engine from the user through the multimodal application an oral instruction to add the word to the ASR lexicon, where the oral instruction is accompanied by an oral spelling of the word from the user. The multimodal application may, for example, include a correction grammar whose rules include a <command> rule that accepts the command 'correct' and an <alphabet> rule that accepts 'a' or 'b' or 'c' . . . and so on. The multimodal application uses the ASR engine to recognize the individual spoken letter in the spelling, concatenates them into a text representation of the missing word, 'martha,' and issues the instruction to add the missing word to the ASR lexicon. The ASR engine receives the instruction along with the spelled word in text format.

The instruction to add the word to the lexicon is not an ordinary speech recognition request, and executing the instruction (322) to add the word to the lexicon is not speech recognition. In the method of FIG. 6 executing (322) the instruction to add the word to the lexicon is carried out by adding (326) the spelled word to an active grammar and compiling (328) the active grammar into the ASR lexicon after adding the spelled word to the active grammar. The ASR engine may compile the grammar by converting with a TTS engine the entire grammar into time-domain digitized words, converting the digitized words to the frequency domain, defining SFV for the words, inferring phonemes for the words from a language-specific acoustic model, and inserting the text forms of the words and the phonemes for the words into the lexicon. Adding the word to the grammar is a useful step because, the fact that the word is missing from the lexicon often means that it also was not in any active grammar.

In the method of FIG. 6, executing (322) the instruction to add the word to the lexicon may also include correcting by the multimodal application an action executed in dependence upon incorrectly recognized speech. If the ASR engine failed to match the missing word, then there was no action executed in dependence upon incorrectly recognized speech. If the ASR engine statistically matched an incorrect word (310), however, the multimodal application may have executed (308) an action in dependence upon the incorrectly recognized speech. If the grammar's dialog used the incorrectly recognized speech merely to fill in a single field value, then simply clearing that field will correct an action executed in dependence upon incorrectly recognized speech. If the effect of the incorrect recognition is execution of a complex semantic interpretation script, then correcting the action executed in dependence upon incorrectly recognized speech may be carried out by triggering an XML Event event with the correction grammar and providing an event listener that triggers a semantic interpretation correction script, reversing the steps taken by the incorrectly-executed semantic interpretation script. Using such methods, this kind of dialog is supported:

FRANK: "Remind me to call Martha at 10 pm"
MULTIMODAL DEVICE: "I've just set a reminder to for you to call Martina at 10 pm."
FRANK: "Correct Martina as M-A-R-T-H-A".
MULTIMODAL DEVICE: "Correction. I've just set a reminder to for you to call Martha at 10 pm."

In view of the explanations set forth above in this paper, readers will recognize that the benefits of providing oral modification of an ASR lexicon of an ASR engine according to various embodiments of the present invention typically include Allowing a user to correcting the voice recognition system when a word that is not in the lexicon is improperly recognized as a word that is in the lexicon.

Allowing a user to utter a statement that contains words not in the ASR engine's lexicon, get feedback as such, and then update the lexicon by correctly spelling the word and adding it, all in a very natural use of spoken language.

Exemplary embodiments of the present invention are described largely in the context of a fully functional computer system for providing oral modification of an ASR lexicon of an ASR engine. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone data communications networks for voice communications and digital data communications data communications networks such as, for example, Ethernets™ and data communications networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for providing oral modification of an automatic speech recognition ('ASR') lexicon of an ASR engine, the method comprising:

receiving, in the ASR engine from a user through a multimodal application, speech for recognition, wherein the ASR engine comprises an ASR lexicon of words that the ASR engine recognizes, and the ASR lexicon does not contain at least one word of the speech for recognition;

indicating by the ASR engine through the multimodal application to the user that the ASR lexicon does not contain the word by returning a message that explicitly indicates that the ASR engine does not recognize the word;

receiving by the ASR engine from the user through the multimodal application an oral instruction to add the word to the ASR lexicon, the oral instruction accompanied by an oral spelling of the word from the user; and
executing the instruction by the ASR engine.

2. The method of claim 1 wherein receiving an instruction to add the at least one word to the ASR lexicon further comprises receiving in the ASR engine from the multimodal application the spelled word in text format.

3. The method of claim 1 wherein executing the instruction further comprises:
adding the spelled word to an active grammar; and
compiling the active grammar into the ASR lexicon after adding the spelled word to the active grammar.

4. The method of claim 1 further comprising determining by the ASR engine that the ASR lexicon does not contain the at least one word.

5. A computer comprising a computer processor and a computer memory operatively coupled to the computer processor, wherein the computer memory stores computer program instructions for providing oral modification of an automatic speech recognition ('ASR') lexicon of an ASR engine, and wherein the computer processor executes the computer program instructions to:
receive, from a user through a multimodal application, speech for recognition, wherein the ASR engine comprises an ASR lexicon of words that the ASR engine recognizes, and the ASR lexicon does not contain at least one word of the speech for recognition;
indicate through the multimodal application to the user that the ASR lexicon does not contain the word by returning a message that explicitly indicates that the ASR engine does not recognize the word;
receive from the user through the multimodal application an oral instruction to add the word to the ASR lexicon, the oral instruction accompanied by an oral spelling of the word from the user; and
execute the instruction.

6. The computer of claim 5 wherein the computer processor executes the computer program instructions to determine that the ASR lexicon does not contain the at least one word.

7. The computer of claim 5 wherein the computer processor receives the instruction to add the at least one word to the ASR lexicon by receiving in the ASR engine from the multimodal application the spelled word in text format.

8. The computer of claim 5 wherein the computer processor executes the instruction by:
adding the spelled word to an active grammar; and
compiling the active grammar into the ASR lexicon after adding the spelled word to the active grammar.

9. A tangible computer program product for providing oral modification of an automatic speech recognition ('ASR') lexicon of an ASR engine, the computer program product encoded with computer program instructions that, when executed by a computer, perform a method comprising:
receiving, in the ASR engine from a user through a multimodal application, speech for recognition, wherein the ASR engine comprises an ASR lexicon of words that the ASR engine recognizes, and the ASR lexicon does not contain at least one word of the speech for recognition;
indicating by the ASR engine through the multimodal application to the user that the ASR lexicon does not contain the word by returning a message that explicitly indicates that the ASR engine does not recognize the word;
receiving by the ASR engine from the user through the multimodal application an oral instruction to add the word to the ASR lexicon, the oral instruction accompanied by an oral spelling of the word from the user; and
executing the instruction by the ASR engine.

10. The computer program product of claim 9, wherein the method further comprises determining by the ASR engine that the ASR lexicon does not contain the at least one word.

11. The computer program product of claim 9 wherein receiving an instruction to add the at least one word to the ASR lexicon further comprises receiving in the ASR engine from the multimodal application the spelled word in text format.

12. The computer program product of claim 9 wherein executing the instruction further comprises:
adding the spelled word to an active grammar; and
compiling the active grammar into the ASR lexicon after adding the spelled word to the active grammar.

* * * * *